United States Patent
Lundström et al.

(10) Patent No.: US 9,664,091 B2
(45) Date of Patent: May 30, 2017

(54) DEVICE AND METHOD FOR FAULT-TRACING PERTAINING TO AN SCR SYSTEM

(71) Applicant: SCANIA CV AB, Södertälje (SE)

(72) Inventors: Mikael Lundström, Hägersten (SE); Magnus Fröberg, Hägersten (SE)

(73) Assignee: SCANIA CV AB (SE)

( * ) Notice: Subject to any disclaimer, the term of this patent is extended or adjusted under 35 U.S.C. 154(b) by 20 days.

(21) Appl. No.: 14/767,358

(22) PCT Filed: Feb. 11, 2014

(86) PCT No.: PCT/SE2014/050167
§ 371 (c)(1),
(2) Date: Aug. 12, 2015

(87) PCT Pub. No.: WO2014/171878
PCT Pub. Date: Oct. 23, 2014

(65) Prior Publication Data
US 2015/0369107 A1    Dec. 24, 2015

(30) Foreign Application Priority Data
Feb. 13, 2013 (SE) ........................ 1350169

(51) Int. Cl.
*F01N 11/00* (2006.01)
*F01N 3/20* (2006.01)
*B01D 53/94* (2006.01)

(52) U.S. Cl.
CPC ........ *F01N 11/002* (2013.01); *B01D 53/9477* (2013.01); *B01D 53/9495* (2013.01);
(Continued)

(58) Field of Classification Search
CPC .... F01N 3/208; F01N 11/002; F01N 2550/02; F01N 2560/026; F01N 2900/1621
See application file for complete search history.

(56) References Cited

U.S. PATENT DOCUMENTS 8,499,545 B2    8/2013   Busch et al.
2009/0126350 A1  5/2009   Shimomura et al.
(Continued)

FOREIGN PATENT DOCUMENTS

DE    10 2010 028846    11/2011
WO    WO 2008/093616 A1    8/2008
(Continued)

OTHER PUBLICATIONS

International Search Report dated May 30, 2014 issued in corresponding International patent application No. PCT/SE2014/050167.

*Primary Examiner* — Jonathan Matthias
(74) *Attorney, Agent, or Firm* — Ostrolenk Faber LLP (57) ABSTRACT

A method for troubleshooting in an SCR system which has a dosing unit (250) for dosing of reducing agent into an engine's exhaust duct (290) upstream of an SCR catalytic converter (270) for reduction of $NO_x$ content in an exhaust flow from said engine and a DOC unit (259). The method comprises steps of: determining (s310) $NO_x$ content in the exhaust flow downstream of said SCR catalytic converter (270); determining satisfactory operation of said SCR catalytic converter (270); progressively altering the dosage of said reducing agent; determining whether said SCR system can reduce $NO_x$ content of the exhaust flow downstream of said SCR catalytic converter to a predetermined extent during altered dosing; using the results of determinations as a basis for deciding whether said DOC unit (259) is faulty or not. Also disclosed is a computer program product having the program code (P) for a computer (200; 210) for implementing the method according to the invention. Also disclosed is a device for troubleshooting in an SCR system and to a motor vehicle equipped with the device.

26 Claims, 4 Drawing Sheets

(52) U.S. Cl.
CPC .......... *F01N 3/208* (2013.01); *F01N 2550/03* (2013.01); *F01N 2560/026* (2013.01); *F01N 2900/1614* (2013.01); *Y02T 10/24* (2013.01); *Y02T 10/47* (2013.01)

(56) References Cited

U.S. PATENT DOCUMENTS

| | | |
|---|---|---|
| 2010/0032605 A1 | 2/2010 | Haege et al. |
| 2011/0239627 A1 | 10/2011 | Sisken et al. |
| 2011/0296905 A1 | 12/2011 | Bastoreala et al. |
| 2012/0006002 A1* | 1/2012 | Hagimoto ............... F01N 3/106 60/274 |

FOREIGN PATENT DOCUMENTS

| | | |
|---|---|---|
| WO | WO 2011/139969 A1 | 11/2011 |
| WO | WO 2012/118429 A1 | 2/2012 |

* cited by examiner

DEVICE AND METHOD FOR FAULT-TRACING PERTAINING TO AN SCR SYSTEM

CROSS-REFERENCE TO RELATED APPLICATIONS

The present application is a 35 U.S.C. §§371 national phase conversion of PCT/SE2014/050167, filed Feb. 11, 2014, which claims priority of Swedish Patent Application No. 1350169-7, filed Feb. 13, 2013, the contents of which are incorporated by reference herein. The PCT International Application was published in the English language.

TECHNICAL FIELD

The present invention relates to a method for troubleshooting in an SCR system, to a computer programme product comprising programme code for a computer for implementing the method, to a device for troubleshooting in an SCR system, and to a motor vehicle equipped with the device.

BACKGROUND OF THE INVENTION

Vehicles today use, for example, urea as a reductant in SCR (selective catalytic reduction) systems which comprise an SCR catalytic converter in which said reductant and $NO_x$ gas can react and be converted to nitrogen gas and water. Various types of reductants may be used in SCR systems. AdBlue is an example of a commonly used reductant.

Said SCR systems may also comprise a diesel oxidation catalyst (DOC) for converting NO gas coming from an engine to $NO_2$ gas and situated upstream of said SCR catalytic converter.

One type of SCR system comprises a container which holds a reductant. The system also has a pump arranged to draw reductant from the container via a suction hose and to supply it via a pressure hose to a dosing unit situated adjacent to an exhaust system of the vehicle, e.g. adjacent to an exhaust pipe of the exhaust system. The dosing unit is arranged to inject a necessary amount of reductant into an exhaust system upstream of the SCR catalytic converter according to operating routines which are stored in a control unit of the vehicle.

There is constant need to reduce the amount of emissions from engines of motor vehicles. This applies not least to heavy motor vehicles such as trucks and buses, since legal requirements for ever smaller emissions are continually tightening.

Fault codes are currently generated in response to certain malfunctions or operational deviations of SCR systems of vehicles. These codes may however be too unspecific, potentially causing service staff great difficulties in identifying a source of malfunction in an SCR system. In certain cases where fault codes pertaining to SCR systems are generated, it may be that some other system is not operating as intended, which may in turn adversely affect the SCR system, with consequent incorrect generation of fault codes for the SCR system.

Although it may be difficult to exactly identify which component of an SCR system is faulty, it is desirable to at least be able to rule out one or more of them. This is particularly relevant in the case for example of an SCR catalytic converter, since removing this component from the vehicle, e.g. for visual examination or other investigations by troubleshooting methods, is expensive and time-consuming.

It is also particularly relevant in the case for example of a diesel oxidation catalyst, since removing this component from the vehicle, e.g. for visual inspection or investigation by other troubleshooting methods, is likewise expensive and time-consuming.

US 2011296905, DE102010028846 and US201032605 describe various methods for troubleshooting in an SCR system.

SUMMARY OF THE INVENTION

One object of the present invention is to propose a novel and advantageous method for troubleshooting in an SCR system.

Another object of the invention is to propose a novel and advantageous device and a novel and advantageous computer programme for troubleshooting in an SCR system.

A further object of the invention is to propose a method, a device and a computer programme for conducting reliable and user-friendly troubleshooting in an SCR system.

One aspect of the present invention is a proposed method for troubleshooting in an SCR system which comprises a dosing unit for dosing of reducing agent into an engine's exhaust duct upstream of an SCR catalytic converter for reduction of $NO_x$ content in an exhaust flow from said engine and a DOC unit, comprising the steps of determining $NO_x$ content in the exhaust flow downstream of said SCR catalytic converter, determining satisfactory operation of said SCR catalytic converter, progressively altering the dosage of said reducing agent during predetermined operating conditions of said DOC unit, determining whether said SCR system can reduce said $NO_x$ content of the exhaust flow downstream of said SCR catalytic converter to a predetermined extent during said progressively altered dosing, and using the results of said determinations as a basis for deciding whether said DOC unit is faulty or not.

Determination of satisfactory operation of said SCR catalytic converter may take place at a temperature which is within a predetermined first temperature range, and said determination of whether said SCR system can reduce said $NO_x$ content of the exhaust flow downstream of said SCR catalytic converter to a predetermined extent may take place at a temperature which is within a predetermined second temperature range. Said first temperature range may be 300-400 degrees Celsius. Said second temperature range may be 200-250 degrees Celsius.

In one aspect of the invention it is thus possible to ensure that the SCR catalytic converter exhibits satisfactory performance at a temperature at which the DOC unit has no effect. Thereafter the temperature of the SCR system may be lowered to a level at which the DOC unit does have an effect. It is thus possible to investigate whether, when both the SCR catalytic converter and the DOC unit exhibit effects, the SCR system achieves $NO_x$ conversion to a desirable extent. Should it be found that $NO_x$ conversion at this lower temperature is not deemed acceptable, it is highly likely that the DOC unit is in some way faulty.

In one aspect of the present invention repeated checks on the performance of the DOC unit may be carried out. This may be done at different temperatures at which the DOC unit is active. Said checks according to the invention may be conducted at at least some of the temperatures 200, 210, 220, 230, 240 and 250 degrees Celsius. The result is a reliable method for troubleshooting in an SCR system. It is thus possible according to the invention to decide whether said DOC unit is faulty or not on the basis of a number of determinations of whether said SCR system can reduce said $NO_x$ content of the exhaust flow downstream of said SCR catalytic converter to a predetermined extent during said progressively altered dosing. These (01782128.1) determinations are therefore conducted at respective different temperatures of the SCR system within a predetermined temperature range at which said DOC unit is active, e.g. within a range of 200-250 degrees Celsius.

The method step of determining satisfactory operation of said SCR catalytic converter may comprise the steps of
  determining $NO_x$ content in the exhaust flow downstream of said SCR catalytic converter,
  progressively altering the dosage of said reducing agent during predetermined operating conditions of said SCR catalytic converter,
  determining whether the SCR catalytic converter can reduce said $NO_x$ content of the exhaust flow downstream of it to a predetermined extent during said progressively altered dosing, and
  using the results of said determinations as a basis for deciding whether said SCR catalytic converter is faulty or not from an $NO_x$ content reduction perspective.

An advantage of determining satisfactory operation of said SCR catalytic converter before it is decided whether the DOC unit is faulty or not is that pollutants in the DOC unit can be burnt away before operation of the SCR system at a temperature at which the DOC unit is active is determined.

The method may comprise the step of:
  establishing said predetermined operating conditions in the form of a specific highest temperature level of said DOC unit and a predetermined exhaust mass flow. It may comprise the step of establishing said predetermined operating conditions in the form of a specific highest temperature level of said DOC unit and a substantially constant and/or predetermined exhaust mass flow. It may comprise the step of establishing said predetermined operating conditions in the form of a predetermined temperature level within a predetermined temperature range of said DOC unit and a substantially constant and/or predetermined exhaust mass flow. It may comprise the step of establishing said predetermined operating conditions in the form of a specific highest temperature level of an exhaust duct from an engine and a substantially constant and/or predetermined exhaust mass flow. It may comprise the step of establishing said predetermined operating conditions in the form of a predetermined temperature level within a predetermined temperature range of an exhaust duct from an engine and a substantially constant and/of predetermined exhaust mass flow. It may comprise the step of establishing said predetermined operating conditions in the form of a specific highest temperature level of exhaust gases in an exhaust duct which is provided to convey said exhaust gases from an engine to surroundings and a substantially constant and/or predetermined exhaust mass flow. It may comprise the step of establishing said predetermined operating conditions in the form of a predetermined temperature level within a predetermined temperature range of exhaust gases in an exhaust duct which is provided to convey said exhaust gases from an engine to surroundings and a substantially constant and/or predetermined exhaust mass flow. Said specific highest temperature level may for example be 250 degrees Celsius. Said specific highest temperature level may for example be 280 degrees Celsius. Said specific highest temperature level may be within a range of for example 230-260 degrees Celsius. Said specific highest temperature level may be within a range of for example 200-260 degrees Celsius.

The method may comprise the step of
  establishing said predetermined operating conditions in the form of a predetermined temperature level within a predetermined temperature range of said SCR system and a predetermined exhaust mass flow.

The method may comprise the step of
  establishing said predetermined operating conditions in the form of a predetermined temperature level within a predetermined temperature range of said DOC unit and a predetermined exhaust mass flow.

The method according to the invention may be implemented as a workshop test. The method according to the invention may be conducted during operation when the vehicle is stationary, e.g. at a workshop or service facility.

It may be applied during operation, e.g. when the vehicle is travelling on a suitable section of road. It may be applied when the vehicle is travelling in circumstances where it is possible to achieve favourable operating situations which may comprise reaching a highest temperature of the vehicle's DOC unit and establishing an exhaust flow favourable for the method.

In one aspect of the invention the method according to the invention may be conducted by means of data detected by an $NO_x$ sensor downstream of said SCR catalytic converter, in which case the other data required may be modelled or calculated in appropriate ways. A cost-effective implementation of the method according to the invention is thus achieved.

The method may comprise the step of
  establishing said predetermined operating conditions by controlling the operation of said engine. Said predetermined operating conditions may relate to a specific speed of said engine. They may relate to a specific load upon said engine. They may relate to a certain fuel dosage of said engine, in which case they may be established in an automatic and controlled way, resulting with advantage in a desirable operating state of the vehicle.

Said operating conditions may comprise a state in which an exhaust flow from an engine of the vehicle is substantially constant.

The step of progressively altering said dosage may comprise continuously increasing or continuously reducing it. An accurate method for troubleshooting may thus be achieved.

The step of progressively altering said dosage may comprise increasing or decreasing it step by step. A relatively quick method for troubleshooting in an SCR system may thus with advantage be achieved.

The method may comprise the step of
  waiting for a continuity state of the reduction of $NO_x$ content downstream of said SCR catalytic converter. Measurements of $NO_x$ content downstream of said SCR catalytic converter which are more correct may thus be achieved, potentially resulting with advantage in high probability of correctly deciding whether said SCR catalytic converter is faulty or not from an $NO_x$ content reduction perspective. Waiting for a continuity state results with advantage in measurement by an $NO_x$ sensor downstream of said SCR catalytic converter at a suitable point in time, e.g. when the SCR system is in a stable state. A certain time for stabilisation of said $NO_x$ sensor may be necessary upon change in reducing agent dosage.

The step of determining whether said SCR catalytic converter can reduce said $NO_x$ content in the exhaust flow downstream of it to a predetermined extent may comprise the step of determining absolute values for said $NO_x$ content in the exhaust flow downstream of said SCR catalytic converter, and/or the steps of determining absolute values for said $NO_x$ content in the exhaust flow upstream of said SCR catalytic converter, determining absolute values for said $NO_x$ content in the exhaust flow downstream of said SCR catalytic converter, and determining a degree of $NO_x$ conversion by the SCR catalytic converter on the basis of said $NO_x$ content in the exhaust flow upstream of it and said $NO_x$ content in the exhaust flow downstream of it.

In this context, two different ways of determining the performance of said SCR catalytic converter are with advantage proposed. A versatile method for partial detection in an SCR system whereby both only said $NO_x$ content of the exhaust flow downstream of said SCR catalytic converter and said degree of $NO_x$ conversion by it can be employed is thus proposed.

The method may comprise the step of representing said SCR catalytic converter's reduction of $NO_x$ content downstream of it during said progressively altered dosing as absolute values of said $NO_x$ content downstream of it as a function of reducing agent dosage or degree of $NO_x$ conversion as a function of reducing agent dosage. The result in one embodiment is a relatively inexpensive implementation of the method according to the invention which involves an extremely limited number of sensors (one $NO_x$ sensor downstream of said SCR catalytic converter). The result in one embodiment is a well-defined basis for calculations by the method according to the invention whereby a degree of $NO_x$ conversion reflects well a prevailing performance of the SCR catalytic converter.

Said $NO_x$ content downstream of said SCR catalytic converter as a function of reducing agent dosage may comprise a minimum, in which case a method involving a relatively limited calculation capacity may be achieved.

Said degree of $NO_x$ conversion as a function of reducing agent dosage may comprise a maximum, in which case a method involving a relatively limited calculation capacity may be achieved.

The method may comprise the step of presenting said results of said determinations of reduction of said $NO_x$ content in the exhaust flow downstream of said SCR catalytic converter 270 to a predetermined extent in the form of a fault code which may by suitable means be presented for an operator of the vehicle. Said fault code may in one version be stored in a memory of a control unit of the vehicle and may at a later stage be presented by suitable means for service staff, e.g. at a workshop. It may in one version be sent automatically via a suitable network to a so-called fleet management system or a haulage business.

The method for troubleshooting in an SCR system may comprise a dosing unit for dosing reducing agent into an engine's exhaust duct upstream of an SCR catalytic converter for reduction of $NO_x$ content in an exhaust flow from said engine and a DOC unit, comprising the step of determining $NO_x$ content in the exhaust flow downstream of said SCR catalytic converter.

The method may further comprise the steps of determining satisfactory operation of said SCR catalytic converter, progressively altering the dosage of said reducing agent during predetermined operating conditions of said DOC unit, determining whether said DOC unit can convert NO to $NO_2$ in the exhaust flow upstream of said SCR catalytic converter to a predetermined extent during said progressively altered dosing, and using the results of said determinations as a basis for deciding whether said DOC unit is faulty or not from a conversion perspective.

The method may comprise the step of carrying out a check on the operation of the SCR system beyond said SCR catalytic converter. This may serve as an effective way of eliminating sources of malfunctions in the SCR system or the vehicle and may with advantage result in a reliable method for troubleshooting in an SCR system. Any possible leakage of exhaust gases or reducing agent may for example thus be detected. A check on the operation of various relevant sensors on board the vehicle may thus be carried out, e.g. $NO_x$ sensors, exhaust mass flow sensors or temperature sensors. This may with advantage result in a reliable method for troubleshooting in an SCR system.

One aspect of the present invention is a proposed method for troubleshooting in an SCR system provided with a dosing unit for dosing reducing agent into an engine's exhaust duct upstream of an SCR catalytic converter for reduction of $NO_x$ content in an exhaust flow from said engine and a DOC unit, comprising the steps of determining $NO_x$ content in the exhaust flow downstream of said SCR catalytic converter, progressively altering the dosage of said reducing agent during predetermined operating conditions of said DOC unit, determining whether said SCR system can reduce said $NO_x$ content of the exhaust flow downstream of said SCR catalytic converter to a predetermined extent during said progressively altered dosing, and using the results of said determinations as a basis for deciding whether said DOC unit is faulty or not. In this aspect the method according to the invention may comprise the step of determining satisfactory operation of said SCR catalytic converter.

The method is easy to implement in existing motor vehicles. Software for troubleshooting in an SCR system according to the invention may be installed in a control unit of the vehicle during the manufacture of the vehicle. A purchaser of the vehicle may thus have the possibility of selecting the function of the method as an option. Alternatively, software which comprises programme code for conducting the innovative method for troubleshooting in an SCR system may be installed in a control unit of the vehicle on the occasion of upgrading at a service station, in which case the software may be loaded into a memory in the control unit.

Software which comprises programme code for troubleshooting in an SCR system is easy to update or replace. Moreover, different parts of the software which comprise programme code for troubleshooting in an SCR system may be replaced independently of one another. This modular configuration is advantageous from a maintenance perspective.

One aspect of the present invention is a proposed device for troubleshooting in an SCR system which comprises a dosing unit for dosing of reducing agent into an engine's exhaust duct upstream of an SCR catalytic converter for reduction of $NO_x$ content in an exhaust flow from said engine, comprising
- a DOC unit situated upstream of said SCR catalytic converter on said exhaust duct,
- means adapted to determining $NO_x$ content in the exhaust flow downstream of said SCR catalytic converter,
- means adapted to determining satisfactory operation of said SCR catalytic converter,
- means adapted to progressively altering the dosage of said reducing agent during predetermined operating conditions of said DOC unit,
- means adapted to determining whether said SCR system can reduce said $NO_x$ content of the exhaust flow downstream of said SCR catalytic converter to a predetermined extent during said progressively altered dosing, and
- means adapted to using the results of said determinations as a basis for deciding whether said DOC unit is faulty or not.

One aspect of the present invention is a proposed device for troubleshooting in an SCR system which comprises a dosing unit for dosing of reducing agent into an engine's exhaust duct upstream of an SCR catalytic converter for reduction of $NO_x$ content in an exhaust flow from said engine and a DOC unit. The device comprises
- means adapted to determining $NO_x$ content in the exhaust flow downstream of said SCR catalytic converter,
- means adapted to progressively altering the dosage of said reducing agent during predetermined operating conditions of said SCR catalytic converter,
- means adapted to determining whether said SCR catalytic converter can reduce said $NO_x$ content of the exhaust flow downstream of it to a predetermined extent during said progressively altered dosing, and
- means adapted to using the results of said determinations as a basis for deciding whether said SCR catalytic converter is faulty or not from an $NO_x$ content reduction perspective.

One aspect of the present invention is a proposed device for troubleshooting in an SCR system which comprises a dosing unit for dosing of reducing agent into an engine's exhaust duct upstream of an SCR catalytic converter for reduction of $NO_x$ content in an exhaust flow from said engine, comprising
- a DOC unit situated upstream of said SCR catalytic converter on said exhaust duct,
- means adapted to determining $NO_x$ content in the exhaust flow downstream of said SCR catalytic converter,
- means adapted to progressively altering the dosage of said reducing agent during predetermined operating conditions of said DOC unit,
- means adapted to determining whether said SCR system can reduce said $NO_x$ content of the exhaust flow downstream of said SCR catalytic converter to a predetermined extent during said progressively altered dosing, and
- means adapted to using the results of said determinations as a basis for deciding whether said DOC unit is faulty or not. The device may comprise means adapted to determining satisfactory operation of said SCR catalytic converter.

The device may comprise
- means adapted to establishing said predetermined operating conditions in the form of a specific highest temperature level in said SCR system and a predetermined exhaust mass flow. The latter may be a substantially constant exhaust mass flow. It may be an exhaust mass flow defined by a value which is within a predetermined range. It may be a well-defined exhaust mass flow. It may be of a magnitude which is defined by a predetermined value.

The device may comprise
- means adapted to establishing said predetermined operating conditions in the form of a specific highest temperature level of said DOC unit and a predetermined exhaust mass flow.

The device may comprise
- means adapted to establishing said predetermined operating conditions in the form of a predetermined temperature level within a predetermined temperature range of said DOC unit and a predetermined exhaust mass flow.

The device may comprise
- means adapted to establishing said predetermined operating conditions in the form of a predetermined highest temperature level of said DOC unit and a predetermined exhaust mass flow.

The device may comprise
- means adapted to establishing said predetermined operating conditions by control of the operation of said engine.

The device may comprise
- means adapted to altering said dosage by continuously increasing or decreasing it.

The device may comprise
- means adapted to progressively altering dosage by increasing or decreasing it step by step.

The device may comprise
- means adapted to waiting for a continuity state of the reduction of $NO_x$ content downstream of said SCR catalytic converter.

As part of the device, said means adapted to determining whether said SCR catalytic converter can reduce said $NO_x$ content of the exhaust flow downstream of said SCR catalytic converter to a predetermined extent may comprise
- means adapted to determining absolute values for said $NO_x$ content in the exhaust flow downstream of said SCR catalytic converter, and/or
- means adapted to determining absolute values for said $NO_x$ content in the exhaust flow upstream of said SCR catalytic converter,
- means adapted to determining absolute values for said $NO_x$ content in the exhaust flow downstream of said SCR catalytic converter, and
- means adapted to determining a degree of $NO_x$ conversion by the SCR catalytic converter on the basis of said $NO_x$ content in the exhaust flow upstream of it and said $NO_x$ content in the exhaust flow downstream of it.

The device may comprise
- means adapted to representing said SCR catalytic converter's reduction of $NO_x$ content downstream of it during said progressively altered dosing as absolute values of said $NO_x$ content downstream of it as a function of reducing agent dosage or degree of $NO_x$ conversion as a function of reducing agent dosage.

As part of the device, said NO$_x$ content downstream of said SCR catalytic converter as a function of reducing agent dosage may comprise a minimum.

As part of the device, said degree of NO$_x$ conversion as a function of reducing agent dosage may comprise a maximum.

The device may comprise means adapted to presenting said results of said determinations of reduction of said NO$_x$ content of the exhaust flow downstream of said SCR catalytic converter to a predetermined extent in the form of a fault code.

The device may comprise means adapted to carrying out a check on the operation of the SCR system beyond said SCR catalytic converter.

The above objects are also achieved with a motor vehicle provided with the device for troubleshooting in an SCR system. The vehicle may be a truck, bus or car.

One aspect of the invention is a proposed computer programme for troubleshooting in an SCR system, which programme comprises programme code for causing an electronic control unit or another computer connected to the electronic control unit to perform steps according to the invention.

One aspect of the invention is a proposed computer programme for troubleshooting in an SCR system, which programme comprises programme code stored on a computer-readable medium for causing an electronic control unit or another computer connected to the electronic control unit to perform steps according to the invention.

One aspect of the invention is a proposed computer programme product which comprises a programme code stored on a computer-readable medium for performing method steps according to the invention when said programme code is run on an electronic control unit or another computer connected to the electronic control unit.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognise further applications, modifications and incorporations in other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations denote similar items in the various diagrams, and FIG. 1 schematically illustrates a vehicle according to an embodiment of the invention.

DETAILED DESCRIPTION OF THE DRAWINGS

Figure 1:
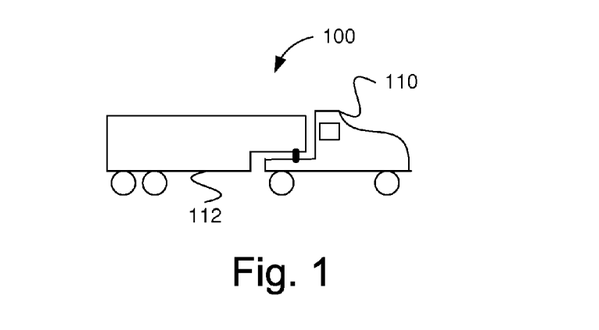

FIG. 1 depicts a side view of a vehicle 100. The exemplified vehicle comprises a tractor unit 110 and a semitrailer 112. The vehicle may be a heavy vehicle, e.g. a truck or a bus. It may alternatively be a car.

It should be noted that the invention is suited to application in any suitable SCR system comprising a DOC and an SCR catalytic converter and is therefore not confined to SCR systems of motor vehicles. The innovative method and the innovative SCR system according to one aspect of the invention are well suited to other platforms which comprise an SCR system than motor vehicles, e.g. watercraft. The watercraft might be of any kind, e.g. motor boats, steamers, ferries or ships.

The innovative method and the innovative SCR system according to one aspect of the invention are also well suited to, for example, systems which comprise for example a rock crusher or the like.

The innovative method and the innovative SCR system according to one aspect of the invention are also well suited to, for example, systems which comprise industrial engines and/or engine-powered industrial robots.

The innovative method and the innovative SCR system according to one aspect of the invention are also well suited to various kinds of power plants, e.g. an electrical power plant which comprises a diesel generator.

The innovative method and the innovative SCR system are also well suited to any suitable engine system which comprises an engine and an SCR system with a DOC and an SCR catalytic converter, e.g. on a locomotive or some other platform.

The innovative method and the innovative SCR system are also well suited to any system which comprises an NO$_x$ generator and an SCR system with a DOC and an SCR catalytic converter.

The term "link" refers herein to a communication link which may be a physical connection such as an optoelectronic communication line, or a non-physical connection such as a wireless connection, e.g. a radio link or microwave link.

The term "line" refers herein to a passage for holding and conveying a fluid, e.g. a reductant in liquid form. The line may be a pipe of any desired size and be made of any suitable material, e.g. plastic, rubber or metal.

The term "reductant" or "reducing agent" refers herein to an agent used for reacting with certain emissions in an SCR system. These emissions may for example be NO$_x$ gas. The terms "reductant" and "reducing agent" are herein used synonymously. In one version, said reductant is so-called AdBlue. Other kinds of reductants may of course be used. AdBlue is herein cited as an example of a reductant, but one skilled in the art will appreciate that the innovative method and the innovative device are feasible with other types of reductants.

Figure 2:
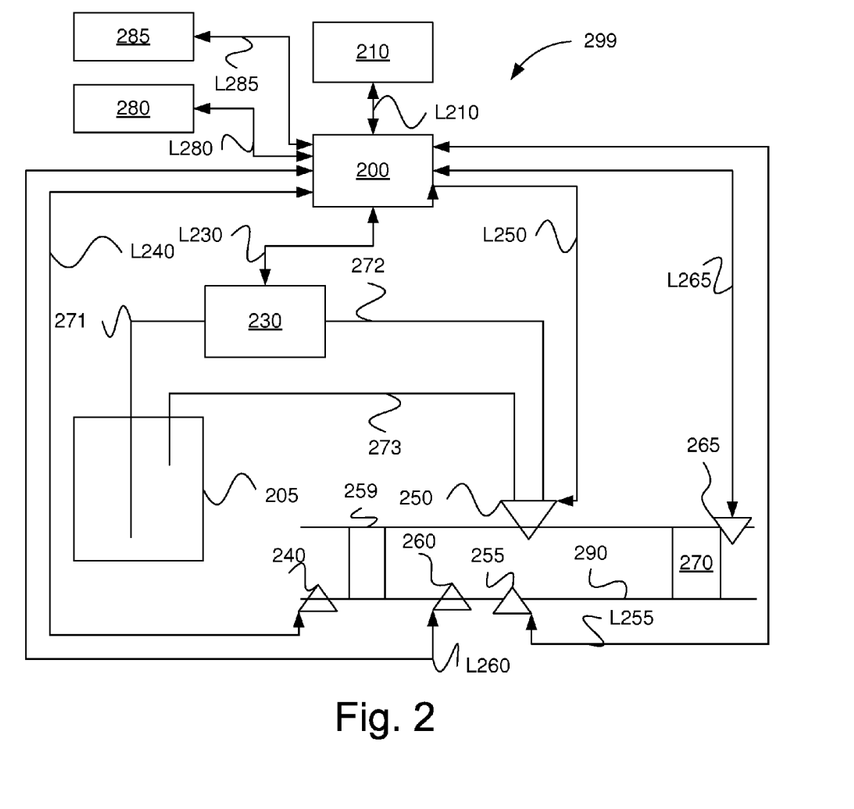
FIG. 2 schematically illustrates a device for troubleshooting in an SCR system, according to an embodiment of the invention.

FIG. 2 depicts a device 299 of the vehicle 100. The device 299 may be situated in the tractor unit 110. This device may be part of an SCR system or comprise an SCR system. It comprises in this example a container 205 provided to hold a reductant. This container is adapted to holding a suitable amount of reductant and also to being replenishable as necessary.

A first line 271 is provided to convey the reductant to a pump 230 from the container 205. The pump 230 may be any suitable pump. It may be a diaphragm pump comprising at least one filter. It may be adapted to being driven by an electric motor (not depicted). It may be adapted to drawing the reductant from the container 205 via the first line 271 and supplying it via a second line 272 to a dosing unit 250. The dosing unit may comprise an electrically operated dosing device by which a flow of reductant added to the exhaust system can be controlled. The pump 230 is adapted to pressurising the reductant in the second line 272. The dosing unit 250 is provided with a throttle unit, which may also be called a throttle valve, against which said pressure of the reductant can be built up in the device 299.

The dosing unit 250 is adapted to supplying said reductant to an exhaust duct 290 of the vehicle 100. More specifically, it is adapted to supplying a suitable amount of reductant in a controlled way to an exhaust duct 290 of the vehicle 100, according to one aspect of the method according to the invention. In this version, an SCR catalytic converter 270 is provided downstream of a location in the exhaust system where the reductant supply is effected. The amount of reductant supplied in the exhaust system is intended to be used in the SCR catalytic converter for reducing the amount of undesirable emissions.

A diesel oxidation catalyst 259 is provided in the exhaust duct 290 downstream of said engine and upstream of said SCR catalytic converter 270 and may be called a DOC unit.

Said diesel oxidation catalyst 259 is adapted to converting NO gas from said engine to $NO_2$ gas. In one version it is adapted to converting said NO gas to $NO_2$ gas with a degree of conversion of about 50%. A suitable degree of conversion might be within a range of 40-60%. In one example it might be within a range of 30-70%. It may be determined on the basis of which type of substrate said SCR catalytic converter 270 comprises.

The dosing unit 250 may be situated adjacent to said exhaust duct 290 which is provided to convey exhaust gases from a combustion engine (not depicted) of the vehicle 100 to said DOC unit 259 and on to said SCR catalytic converter 270 and thence to surroundings of the vehicle.

A third line 273 provided between the dosing unit 250 and the container 205 is adapted to conveying back to the container a certain amount of the reductant which has been fed to the dosing valve 250.

The first control unit 200 is arranged for communication with the pump 230 via a link L230 and is adapted to controlling the operation of the pump. In one example it is adapted to controlling the pump by means of an electric motor (not depicted). This control unit is adapted to varying a working pressure in the second line 272. There are various suitable ways of achieving this. In one example the first control unit is adapted to altering a prevailing speed RPM of the pump 230. The working pressure may thus be altered in desirable ways. It may be increased by raising the speed of the pump and be decreased by lowering the speed of the pump The first control unit 200 is arranged for communication with a first temperature sensor 240 via a link L240. This first sensor is adapted to detecting a prevailing temperature T1 of an exhaust flow from the vehicle's engine. In one example it is situated on said exhaust duct 290 immediately downstream of the vehicle's engine and upstream of said DOC unit 259 and upstream of a dosing unit 250. It may be at a suitable location on said exhaust duct. It is adapted to continuously detecting a prevailing temperature T1 of the exhaust flow and sending signals which contain information about said temperature T1 to the first control unit 200 via the link L240.

The first control unit 200 is arranged for communication with a second temperature sensor 260 via a link L260. This second sensor may be adapted to detecting a prevailing temperature T2 of a surface in the exhaust system where the reducing agent vaporises. It may be adapted to detecting a prevailing temperature T2 of the exhaust duct 290 at a suitable location. It may be adapted to detecting a prevailing temperature T2 of a suitable surface or component of the exhaust duct. In one example it is situated on the exhaust duct upstream of the dosing unit 250. In one example it is adapted to detecting a prevailing temperature T2 of said DOC unit 259. In one example it is situated in the exhaust duct 290 upstream of the dosing unit 250. In another example it is situated in a vaporisation unit (not depicted) or the SCR catalytic converter 270 downstream of the dosing unit. It is adapted to continuously detecting a prevailing temperature T2 of a surface or component of the exhaust duct 290 and sending signals which contain information about said temperature T2 to the first control unit 200 via the link L260.

In one version the first control unit 200 and/or the second control unit 210 are adapted to calculating said first temperature T1. This may be done by means of a stored calculation model. The first control unit and/or the second control unit may be adapted to calculating said first temperature T1 on the basis, for example, of a prevailing exhaust mass flow, prevailing speed of the engine and prevailing load upon the engine.

In one version the first control unit 200 and/or the second control unit 210 are adapted to calculating said second temperature T2. This may be done by means of a stored calculation model. The first control unit and/or the second control unit may be adapted to calculating said second temperature T2 on the basis, for example, of a prevailing exhaust mass flow, prevailing speed of the engine and prevailing load upon the engine.

A first $NO_x$ sensor 255 is arranged for communication with the first control unit 200 via a link L255. This first sensor is adapted to continuously determining a prevailing $NO_x$ content of the exhaust flow upstream of said SCR catalytic converter 270. In one example it is situated on the exhaust duct 290 upstream of said dosing unit 250. It is adapted to continuously sending signals which convey information about a prevailing $NO_x$ content upstream of said SCR catalytic converter to the first control unit 200.

A second $NO_x$ sensor 265 is arranged for communication with the first control unit 200 via a link L265. This second sensor is adapted to continuously determining a prevailing $NO_x$ content of the exhaust flow downstream of said SCR catalytic converter 270. It is adapted to continuously sending signals which convey information about a prevailing $NO_x$ content downstream of said SCR catalytic converter to the first control unit 200.

In one version the first control unit 200 and/or the second control unit 210 are adapted to calculating said first $NO_x$ content upstream of said SCR catalytic converter 270. This may be done by means of a stored calculation model.

The first control unit and/or the second control unit may be adapted to calculating said first $NO_x$ content on the basis, for example, of a prevailing exhaust mass flow, prevailing speed of the engine and prevailing load upon the engine.

The first control unit 200 is adapted to determining a prevailing degree of $NO_x$ conversion on the basis of said calculated or measured $NO_x$ content upstream of said SCR catalytic converter 270 and said measured $NO_x$ content downstream of said SCR catalytic converter.

The first control unit 200 is adapted to determining $NO_x$ content in the exhaust flow downstream of said SCR catalytic converter 270. It is adapted to determining $NO_x$ content in the exhaust flow upstream of said SCR catalytic converter. It is adapted to establishing operating conditions of said SCR catalytic converter which are suitable for the purpose. It is adapted, during predetermined operating conditions of said SCR catalytic converter, to progressively altering the dosage of said reducing agent. It is adapted to determining whether the SCR catalytic converter can reduce said $NO_x$ content of the exhaust flow downstream of said SCR catalytic converter to a predetermined extent during said progressively altered dosing. It is adapted to using the results of said determinations as a basis for deciding whether said SCR catalytic converter is faulty or not from an $NO_x$ content reduction perspective.

The first control unit 200 is adapted to determining satisfactory operation of said SCR catalytic converter 270. This may be done in suitable ways. During predetermined operating conditions of said SCR catalytic converter it may be done by progressively altering the dosage of said reducing agent. Said operating conditions may for example comprise a temperature within a predetermined range Tint1 of 300-400 degrees Celsius of the SCR catalytic converter. In this context the first control unit is adapted to determining whether said SCR catalytic converter can reduce an $NO_x$ content of the exhaust flow downstream of said SCR catalytic converter to a predetermined extent during said progressively altered dosing. It is adapted to using the results of said determinations as a basis for deciding whether said DOC unit is faulty or not.

The first control unit 200 is adapted, during predetermined operating conditions of said DOC unit 259, to progressively altering the dosage of said reducing agent. Said operating conditions may for example comprise a temperature within a predetermined range Tint2 of 200-250 degrees Celsius of the DOC unit. The first control unit is adapted to determining whether said SCR system can reduce said $NO_x$ content of the exhaust flow downstream of said SCR catalytic converter to a predetermined extent during said progressively altered dosing. It is adapted to using the results of said determinations as a basis for deciding whether said DOC unit is faulty or not.

The first control unit 200 is arranged for communication with presentation means 280 via a link L280. Said means 280 may be situated in a driver's cab of the vehicle 100. Said means may be permanently fitted in the vehicle. Said means may be a mobile electronic unit. Said means may comprise for example a viewing screen. The first control unit 200 is adapted to presenting a fault code or other relevant information pertaining to the innovative method for troubleshooting in an SCR system. It may be adapted to using said means 280 to present a result as to whether said DOC unit 259 is faulty or not. It may be adapted to using said means 280 to present a result as to whether said SCR catalytic converter 270 exhibits satisfactory operation or not. The first control unit is arranged for communication via a link 285 with a communication unit L285 which may for example be situated at a service station, workshop or haulage business premises or be part of a so-called fleet management system.

Said communication unit 285 may be situated in a driver's cab of the vehicle 100. It may be fitted permanently in the vehicle. It may be a mobile electronic unit. It may for example comprise a viewing screen. The first control unit 200 is adapted to presenting automatically or upon request a fault code or other relevant information pertaining to the innovative method for troubleshooting in an SCR system. It may be adapted to using said communication terminal 285 to present a result as to whether said SCR catalytic converter 270 is faulty or not from an $NO_x$ content reduction perspective. It unit may be adapted to using said communication terminal to present a result as to whether said DOC unit 259 is faulty or not.

The first control unit 200 is arranged for communication with the dosing unit 250 via a link L250. It is adapted to controlling the operation of the dosing unit in order for example to regulate the supply of reductant to the exhaust system of the vehicle 100.

The first control unit 200 is adapted to calculating an exhaust mass flow MF of the exhaust gases from the vehicle's engine. It is adapted to continuously determining an exhaust mass flow MF of the exhaust gases from the vehicle's engine. This may be done in any suitable way.

In one version the subsystem comprises a mass flow sensor (not depicted) adapted to continuously measuring a prevailing exhaust mass flow from the engine of the vehicle 100 in the exhaust duct 290 upstream of said SCR catalytic converter 270. Said sensor is adapted to continuously sending signals which contain information about a prevailing exhaust mass flow to the first control unit via a link provided for the purpose.

A second control unit 210 is arranged for communication with the first control unit 200 via a link L210. This second control unit may be detachably connected to the first control unit 200. It may be a control unit external to the vehicle 100. It may be adapted to conducting the innovative method steps according to the invention. It may be used to cross-load software to the first control unit 200, particularly software for applying the innovative method. It may alternatively be arranged for communication with the first control unit via an internal network of the vehicle. It may be adapted to performing substantially similar functions to those of the first control unit, e.g. progressively altering the dosage of said reducing agent during predetermined operating conditions of the SCR catalytic converter 270;

determining whether the SCR catalytic converter can reduce an $NO_x$ content of the exhaust flow downstream of it to a predetermined extent during said progressively altered dosing; and using the result of said determination as a basis for deciding whether said SCR catalytic converter is faulty or not from an $NO_x$ content reduction perspective.

The second control unit 210 may be adapted to determining satisfactory operation of said SCR catalytic converter 270, progressively altering the dosage of said reducing agent during predetermined operating conditions of said DOC unit 259, determining whether said SCR system can reduce said $NO_x$ content of the exhaust flow downstream of said SCR catalytic converter to a predetermined extent during said progressively altered dosing, and using the results of said determinations to decide whether said DOC unit 259 is faulty or not.

Figure 3A:
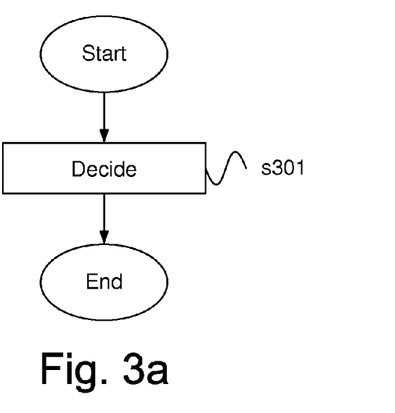
FIG. 3a schematically illustrates a flowchart of a method according to an embodiment of the invention.

FIG. 3*a* is a schematic flowchart illustrating a method for troubleshooting in an SCR system provided with a dosing unit for dosing of reducing agent into an engine's exhaust duct upstream of an SCR catalytic converter for reduction of $NO_x$ content in an exhaust flow from said engine and a DOC unit, according to one embodiment of the invention. The method comprises a first step s301 comprising the steps of determining $NO_x$ content in the exhaust flow downstream of said SCR catalytic converter 270, determining satisfactory operation of said SCR catalytic converter, progressively altering the dosage of said reducing agent during predetermined operating conditions of said DOC unit, determining whether said SCR system can reduce said $NO_x$ content of the exhaust flow downstream of said SCR catalytic converter to a predetermined extent during said progressively altered dosing, and using the results of said determinations to decide whether said DOC unit 259 is faulty or not.

The method ends after step s301.

Figure 3B:
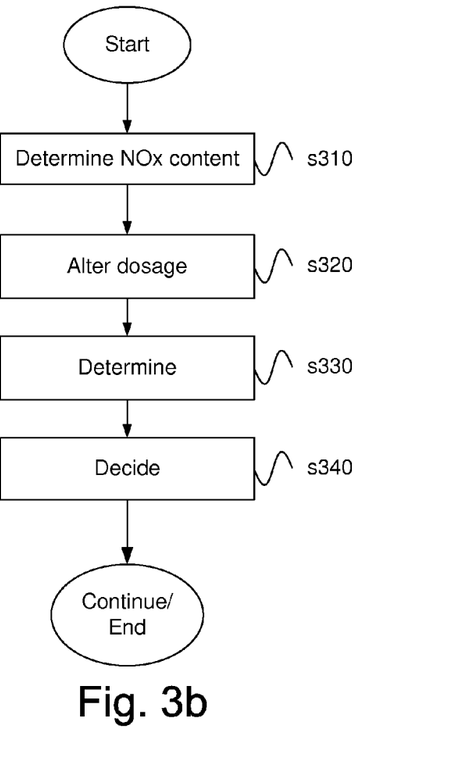
FIG. 3b schematically illustrates a more detailed flowchart of a method according to an aspect of the invention.

FIG. 3b is a schematic flowchart illustrating part of a method for troubleshooting in an SCR system provided with a dosing unit 250 for dosing of reducing agent into an engine's exhaust duct 290 upstream of an SCR catalytic converter 270 for reduction of $NO_x$ content in an exhaust flow from said engine and a DOC unit 259, according to an aspect of the present invention.

The method comprises a first step s310 which may comprise the step of activating the method according to the invention. Said activation may be effected by an operator of the vehicle 100. It may be effected by workshop staff or service staff at a workshop or service facility. Said activation may be by use of said presentation means 280 and/or said communication unit 285.

Method step s310 may comprise the step of establishing a suitable operating state for the method according to the invention. This step may comprise the step of establishing predetermined operating conditions in the form of a specific lowest temperature level of said SCR catalytic converter 270 and a predetermined exhaust mass flow. It may comprise the step of establishing predetermined operating conditions in the form of a specific temperature level within a predetermined range Tint1 for said first temperature T1 and/or said second temperature T2. Said exhaust mass flow may be determined by means intended for the purpose, such as a mass flow sensor or suitable calculation means, e.g. the first control unit 200. Method step s310 may comprise the step of establishing predetermined operating conditions in the form of a specific lowest level for said first temperature T1 and/or said second temperature T2. It may comprise the step of establishing said predetermined operating conditions by control of the operation of said engine.

Method step s310 comprises the step of determining $NO_x$ content in the exhaust flow downstream of said SCR catalytic converter, e.g. by measurement by said $NO_x$ sensor 265.

Method step s310 is followed by a step s320.

Method step s320 comprises the step, during predetermined operating conditions of said SCR catalytic converter, of progressively altering the dosage of said reducing agent. It may comprise progressively altering said dosage by continuously increasing or decreasing it. It may comprise progressively altering said dosage by increasing or decreasing it step by step.

The first control unit 200 and/or the second control unit 210 may thus continuously or intermittently determine the performance of the SCR catalytic converter 270 by determining an $NO_x$ content downstream of it and/or degree of $NO_x$ conversion by it.

It should be noted that $NO_x$ content downstream of said SCR catalytic converter and/or degree of $NO_x$ conversion by the SCR catalytic converter may be determined both for progressively increasing dosage and for progressively decreasing dosage of reducing agent. In one version the dosage may be continuously directed both towards increase and towards decrease during determination of said $NO_x$ content downstream of said SCR catalytic converter and/or degree of $NO_x$ conversion by it.

In one version the dosage may be continuously directed towards increase from a relatively low dosage during determination of said $NO_x$ content downstream of said SCR catalytic converter and/or degree of $NO_x$ conversion by it.

In one version the dosage may be continuously directed towards decrease from a relatively high dosage during determination of said $NO_x$ content downstream of said SCR catalytic converter and/or degree of $NO_x$ conversion by it.

In one version the dosage may first be continuously directed towards decrease from a relatively high dosage, and thereafter be continuously directed towards increase from a relatively low dosage, during determination of said $NO_x$ content downstream of said SCR catalytic converter and/or degree of $NO_x$ conversion by it.

In one version the dosage may first be continuously directed towards increase from a relatively low dosage, and thereafter be continuously directed towards decrease from a relatively high dosage, during determination of said $NO_x$ content downstream of said SCR catalytic converter and/or degree of $NO_x$ conversion by it.

In one example said dosage may sweep respectively towards increase and towards decrease within a suitable dosage range, making it possible with advantage to cater for a more useful subrange of reducing agent dosage. Said subrange may with advantage be a suitable subrange which comprises a maximum degree of $NO_x$ conversion by the SCR catalytic converter.

Method step s320 is followed by a step s330.

Method step s330 comprises the step of determining whether the SCR catalytic converter can reduce said $NO_x$ content of the exhaust flow downstream of it to a predetermined extent during said progressively altered dosing.

Step s330 may comprise the step of determining the reducing agent dosage which results in maximum performance of the SCR catalytic converter 270 during given operating conditions. In one version a maximum degree of $NO_x$ conversion which reflects a maximum performance of the SCR catalytic converter during given operating conditions is determined. In one version a minimum $NO_x$ content downstream of said SCR catalytic converter which reflects a maximum performance of it during given operating conditions is determined.

Method step s330 is followed by a step s340.

Method step s340 comprises the step of using the results of said determinations as a basis for deciding whether said SCR catalytic converter 270 is faulty or not from an $NO_x$ content reduction perspective. It thus comprises the step of determining satisfactory operation of said SCR catalytic converter.

This may be done by comparing said maximum degree of $NO_x$ conversion determined with a predetermined value TH1. If said maximum conversion is greater than said value TH1, the SCR catalytic converter is not deemed faulty. If said maximum conversion is below said value TH1, the SCR catalytic converter is deemed faulty. It is thus possible to determine whether said SCR catalytic converter exhibits satisfactory operation or not.

This may alternatively or supplementarily be done by comparing said minimum $NO_x$ content determined with a predetermined value TH2. If said minimum $NO_x$ content is below said value TH2, the SCR catalytic converter 270 is not deemed faulty. If said minimum $NO_x$ content is greater than said value TH2, the SCR catalytic converter is deemed faulty. It is thus possible to determine whether said SCR catalytic converter exhibits satisfactory operation or not.

Method step s340 may comprise the step of presenting said results of said determinations in the form of a fault code. Said results may in one version serve as a basis for determining whether said DOC unit 259 is faulty or not. If it is found that said SCR catalytic converter 270 exhibits satisfactory operation, the method according to the invention continues with a step s350. If it is found that said SCR catalytic converter does not exhibit satisfactory operation, this result may be presented, in which case the method according to the invention may be discontinued and the steps described with reference to FIG. 3c will not be performed. Step s340 may comprise presenting said results for an operator of the vehicle 100, e.g. via said presentation means 280. It may comprise presenting said results for service staff at a workshop or service facility, e.g. by means of said communication unit 285.

After step s340, part of the method according to the invention ends, viz. the part in which satisfactory operation of the SCR catalytic converter 270 can be determined. If said SCR catalytic converter exhibits satisfactory operation, the method according to the invention continues with the steps described in more detail with reference to FIG. 3c (s350) which make it possible to determine whether said DOC unit 259 is faulty or not.

Figure 3C:
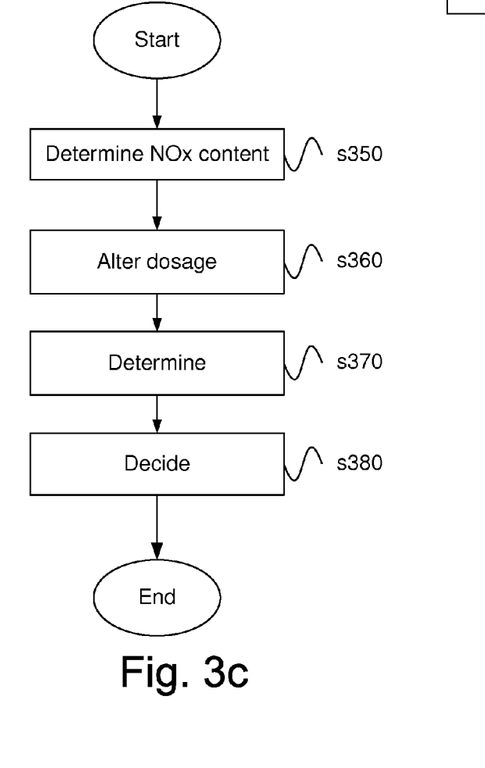
FIG. 3c schematically illustrates a more detailed flowchart of a method according to an embodiment of the invention.

FIG. 3c is a schematic diagram illustrating part of a method for troubleshooting in an SCR system which comprises a dosing unit 250 for dosing of reducing agent into an engine's exhaust duct 290 upstream of an SCR catalytic converter 270 for reduction of $NO_x$ content in an exhaust flow from said engine and a DOC unit 259, according to one aspect of the present invention. Here the method according to the invention continues from step s340.

The method according to the invention comprises a step s350 which may comprise the step of activating a continuation of the method. Said activation may be effected by an operator of the vehicle 100. It may be effected by workshop staff or service staff at a workshop or service facility. Said activation may be by use of said presentation means 280 and/or said communication unit 285.

Method step s350 may comprise the step of establishing a suitable operating state for the method according to the invention. It may comprise the step of establishing predetermined operating conditions in the form of a specific highest temperature level of said DOC unit 259 and a predetermined exhaust mass flow. It may comprise the step of establishing predetermined operating conditions in the form of a predetermined temperature level of said DOC unit and a predetermined exhaust mass flow. Said temperature level may be within a range of 200-250 degrees Celsius. Said exhaust mass flow may be determined by means intended for the purpose, such as a mass flow sensor or suitable calculation means, e.g. the first control unit 200. Method step s350 may comprise the step of establishing predetermined operating conditions in the form of a specific highest temperature level for said first temperature T1 and/or said second temperature T2. It may comprise the step of establishing said predetermined operating conditions by control of the operation of said engine.

Method step s350 may comprise the step of establishing predetermined operating conditions in the form of a specific temperature level within a predetermined range Tint2 for said temperature T1 and/or said second temperature T2.

Method step s350 comprises the step of determining $NO_x$ content in the exhaust flow downstream of said SCR catalytic converter 270, e.g. by measurement by said $NO_x$ sensor 265.

Method step s350 is followed by a step s360.

Method step s360 comprises the step, during predetermined operating conditions of said DOC unit 259, of progressively altering the dosage of said reducing agent. It may comprise progressively altering said dosage by continuously increasing or decreasing it. It may comprise progressively altering said dosage by increasing or decreasing it step by step.

The first control unit 200 and/or the second control unit 210 may thus continuously or intermittently determine the performance of the SCR catalytic converter 270 by determining an $NO_x$ content downstream of said SCR catalytic converter and/or degree of $NO_x$ conversion by the SCR catalytic converter. The first control unit 200 and/or the second control unit 210 may thus continuously or intermittently determine the performance of the DOC unit 259 by determining an $NO_x$ content downstream of said SCR catalytic converter and/or a degree of $NO_x$ conversion by the SCR catalytic converter.

It should be noted that $NO_x$ content downstream of said SCR catalytic converter and/or degree of $NO_x$ conversion by the SCR catalytic converter may be determined both for progressively increasing dosage and for progressively decreasing dosage of reducing agent. In one version the dosage may be continuously directed both towards increase and towards decrease during determination of said $NO_x$ content downstream of said SCR catalytic converter and/or degree of $NO_x$ conversion by the SCR catalytic converter.

In this context it should be noted that the performance of said DOC unit 259 may be determined indirectly by observing the performance of said SCR catalytic converter. According to the description with reference for example to FIG. 3b, satisfactory operation of said SCR catalytic converter may be determined at a temperature above, for example, 300 degrees Celsius. If $NO_x$ conversion does not take place to a desirable extent at a lower temperature, e.g. within a range Tint2 of 200-250 degrees Celsius in which said DOC unit 259 is active, it may be found that said DOC unit is probably faulty.

In one version the dosage may be continuously directed towards increase from a relatively low dosage during determination of said $NO_x$ content downstream of said SCR catalytic converter and/or degree of $NO_x$ conversion by it.

In one version the dosage may be continuously directed towards decrease from a relatively high dosage during determination of said $NO_x$ content downstream of said SCR catalytic converter and/or degree of $NO_x$ conversion by it.

In one version the dosage may first be continuously directed towards decrease from a relatively high dosage, and thereafter be continuously directed towards increase from a relatively low dosage, during determination of said $NO_x$ content downstream of said SCR catalytic converter and/or degree of $NO_x$ conversion by it.

In one version the dosage may first be continuously directed towards increase from a relatively low dosage, and thereafter be continuously directed towards decrease from a relatively high dosage, during determination of said $NO_x$ content downstream of said SCR catalytic converter and/or degree of $NO_x$ conversion by it.

In one example said dosage may be swept towards increase and towards decrease within a suitable dosage range, making it possible with advantage to cater for a more useful subrange of reducing agent dosage. Said subrange may with advantage be a suitable subrange which comprises a maximum degree of $NO_x$ conversion by the SCR catalytic converter 270.

Method step s360 is followed by a step s370.

Method step s370 comprises the step of determining whether the SCR catalytic converter can reduce said $NO_x$ content of the exhaust flow downstream of said SCR catalytic converter to a predetermined extent during said progressively altered dosing.

Step s370 may comprise the step of determining the reducing agent dosage which results in maximum performance of the SCR catalytic converter 270 during given operating conditions. In one version a maximum degree of NO conversion which reflects a maximum performance of the SCR catalytic converter during given operating conditions is determined. In one version a minimum $NO_x$ content downstream of said SCR catalytic converter which reflects a maximum performance of it during given operating conditions is determined. Said maximum performance of the SCR catalytic converter serves here as an indicator of the operation of said DOC unit 259 in a temperature range of for example 200-250 degrees Celsius.

Method step s370 is followed by a step s380.

Method step s380 comprises the step of using the results of said determinations as a basis for deciding whether said DOC unit 259 is faulty or not.

This may be done by comparing said maximum degree of conversion determination with a predetermined value TH3. If said maximum conversion is greater than said value TH3, the DOC unit is not deemed faulty. If said maximum conversion is below said value TH3, the DOC unit is deemed faulty. Said value TH3 is a suitable value. It may be determined empirically.

This may alternatively or supplementarily be done by comparing said minimum $NO_x$ content with a predetermined value TH4. If said minimum NO content is below said value TH4, the DOC unit 259 is not deemed faulty. If said minimum $NO_x$ content is greater than said value TH4, the DOC unit is deemed faulty. Said value TH4 is a suitable value. It may be determined empirically.

Method step s380 may comprise the step of presenting said results of said determinations in the form of a fault code. This step may comprise presenting said results for an operator of the vehicle 100, e.g. via said presentation means 280. It may comprise presenting said results for service staff at a workshop or service facility, e.g. by means of said communication unit 285.

The method ends after step s380.

Figure 4A:
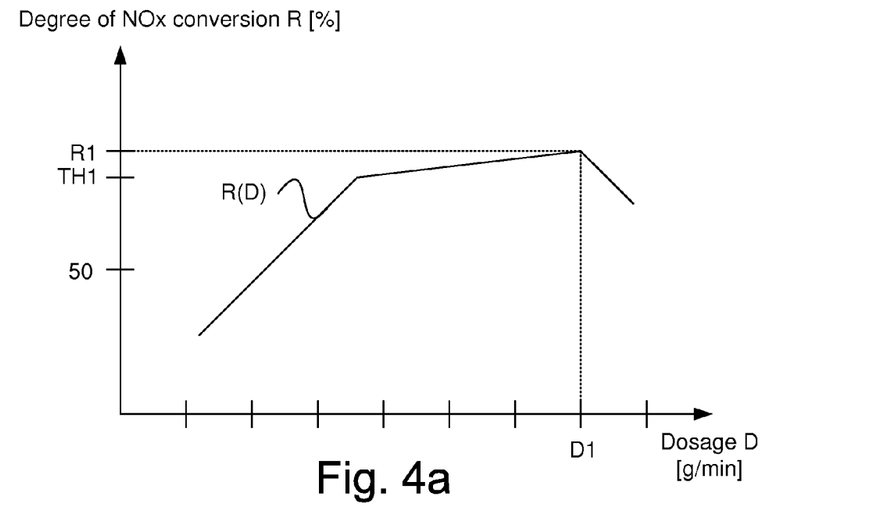
FIG. 4a is a schematic diagram illustrating an aspect of the invention.

FIG. 4*a* is a diagram of degree of $NO_x$ conversion R by the SCR catalytic converter 270 as a function of amount of reducing agent D dosed by the dosing unit 250. Said amount of reducing agent dosed may be a prevailing amount dosed. It may be an average value determined in a suitable way. The degree of $NO_x$ conversion R is expressed as a percentage (%). The reducing agent dosage D is expressed in g/minute.

The degree of conversion R may be determined by equation 1 below:

$$\text{Degree of } NO_x \text{ conversion} = 1 - (NO_x \text{ content downstream}/NO_x \text{ content upstream}) \quad (1)$$

On this basis the SCR catalytic converter 270 presents a highest degree of conversion R1 at a dosage D1. The value R1 therefore represents a maximum value for degree of $NO_x$ conversion on said curve R(D).

In one aspect of the invention the SCR catalytic converter 270 may be found to be not faulty from an $NO_x$ content reduction perspective if said value R1 is greater than a predetermined threshold value TH1, in which case it may thus be found that said catalyst exhibits satisfactory operation. Said value TH1 may be a suitable value. It might for example be 90%, 95% or 98%. It might be within a range of for example 95-99%. This is described in more detail with reference to FIG. 3*b* and method step s340.

In one aspect of the invention the SCR catalytic converter 270 may be found to be faulty from an $NO_x$ content reduction perspective if said value R1 is below said predetermined threshold value TH1. This is described in more detail with reference to FIG. 3*b* and method step s340.

It should be noted that dosing of said reducing agent takes place during predetermined operating conditions of said SCR catalytic converter 270. In one example said curve is only generated when a temperature T2 of the catalyst is above a predetermined temperature Tth and a relatively high and/or steady exhaust mass flow prevails. In one example said curve is only generated when a temperature T2 of the catalyst 270 is within a predetermined range Tint1 and a relatively high and/or steady exhaust mass flow prevails.

In one example said curve is only generated when a temperature T1 of the exhaust gases is above a predetermined temperature Tth and a relatively high and/or steady exhaust mass flow prevails. In one example said curve is only generated when a temperature T1 of the exhaust gases is within a predetermined range Tint1 and a relatively high and/or steady exhaust mass flow prevails. Said operating conditions may be established by control of the vehicle's engine by said first control unit 200 and/or said second control unit 210.

In one aspect of the invention the DOC unit 259 may be found not to be faulty if said value R1 is above a predetermined threshold value TH3. Said value TH3 may be a suitable value. It might for example be 80%, 85% or 90%. It might be within a range of for example 95-99%. This is described in more detail with reference to FIG. 3*c* and method step s380.

In one aspect of the invention the DOC unit 259 may be found to be faulty if said value R1 is below said predetermined threshold value TH3. This is described in more detail with reference to FIG. 3*c* and method step s380.

It should be noted that dosing of said reducing agent takes place during predetermined operating conditions of said DOC unit 259. In one example said curve is only generated when a temperature T2 of the catalyst 270 or the DOC unit 259 is below a predetermined level and a relatively high and/or steady exhaust mass flow prevails. In one example said curve is only generated when a temperature T2 of the catalyst 270 or the DOC unit 259 is within a predetermined range Tint2 and a relatively high and/or steady exhaust mass flow prevails.

In one example said curve is only generated when a temperature T1 of the exhaust gases is above a predetermined temperature Tth and a relatively high and/or steady exhaust mass flow prevails. Said temperature Tth may be 250 degrees Celsius. In one example said curve is only generated when a temperature T1 of the exhaust gases is within a predetermined range Tint2 and a relatively high and/or steady exhaust mass flow prevails. Said operating conditions may be established by control of the vehicle's engine by said first control unit 200 and/or said second control unit 210.

Figure 4B:
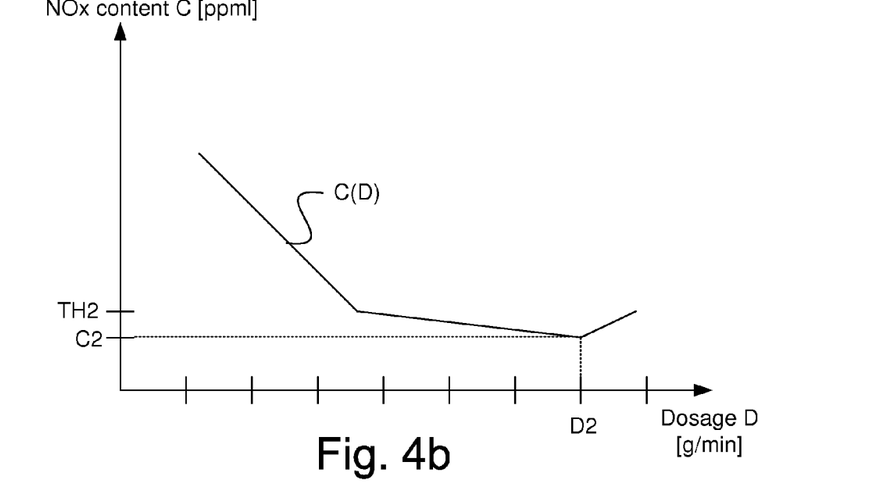
FIG. 4b is a schematic diagram illustrating an aspect of the invention.

FIG. 4*b* is a diagram of $NO_x$ content C downstream of said SCR catalytic converter 270 as a function of amount of reducing agent D dosed by the dosing unit 250. The $NO_x$ content C is expressed in ppm (parts per million). The reducing agent dosage D is expressed in g/minute.

On this basis the SCR catalytic converter 270 achieves a lowest $NO_x$ content C2 downstream of it at a dosage D2. The value C2 thus denotes a minimum value for $NO_x$ content downstream of said catalyst of a function C(D).

In one aspect of the invention the SCR catalytic converter 270 may be found to be not faulty from an $NO_x$ content reduction perspective if said value C2 is below a predetermined threshold value TH2, in which case it may thus be found that said catalyst exhibits satisfactory operation. Said value TH2 may be a suitable value. It might for example be 40, 50 or 60 ppm. It might be within a range of for example 70-100 ppm. This is described in more detail with reference to FIG. 3b and method step s340.

In one aspect of the invention SCR catalytic converter 270 may be found to be faulty from an $NO_x$ content reduction perspective if said value C2 is above said predetermined threshold value TH2. This is described in more detail with reference to FIG. 3b and method step s340.

It should be noted that dosing of said reducing agent takes place during predetermined operating conditions of said SCR catalytic converter 270. In one example said curve C(D) is only generated when a temperature T2 of the catalyst is above a predetermined temperature Tth and a relatively high and/or steady exhaust mass flow prevails. In one example said curve C(D) is only generated when a temperature T2 of the catalyst is within a predetermined range Tint1 and a relatively high and/or steady exhaust mass flow prevails. In one example said curve C(D) is only generated when a temperature T1 of the exhaust gases is greater than a predetermined temperature Tth and a relatively high and/or steady exhaust mass flow prevails. In one example said curve C(D) is only generated when a temperature T1 of the catalyst is within a predetermined range Tint1 and a relatively high and/or steady exhaust mass flow prevails. Said operating conditions may be established by control of the vehicle's engine by said first control unit 200 and/or said second control unit 210.

In one aspect of the invention the DOC unit 259 may be found to be not faulty if a value C2 is below a predetermined threshold value TH4. Said value TH4 may be a suitable value. It might for example be 50, 70 or 90 ppm. It might for example be within the range of 80-120 ppm. This is described in more detail with reference to FIG. 3c and method step s380.

In one aspect of the invention the DOC unit 259 may be found faulty to be if said value C2 is above said predetermined threshold value TH4. This is described in more detail with reference to FIG. 3c and method step s380.

It should be noted that dosing of said reducing agent takes place during predetermined operating conditions of said DOC unit 259. In one example said curve C(D) is only generated when a temperature T2 of the catalyst 270 or the DOC unit 259 is below a predetermined temperature Tth and a relatively high and/or steady exhaust mass flow prevails. In one example said curve C(D) is only generated when a temperature T2 of the catalyst 270 or the DOC unit 259 is within a predetermined range Tint2 and a relatively high and/or steady exhaust mass flow prevails. In one example said curve C(D) is only generated when a temperature T1 of the exhaust gases is below a predetermined temperature Tth and a relatively high and/or steady exhaust mass flow prevails. In one example said curve C(D) is only generated when a temperature T1 of the exhaust gases is within a predetermined range Tint2 and a relatively high and/or steady exhaust mass flow prevails. Said operating conditions may be established by control of the vehicle's engine by said first control unit 200 and/or said second control unit 210.

Figure 5:
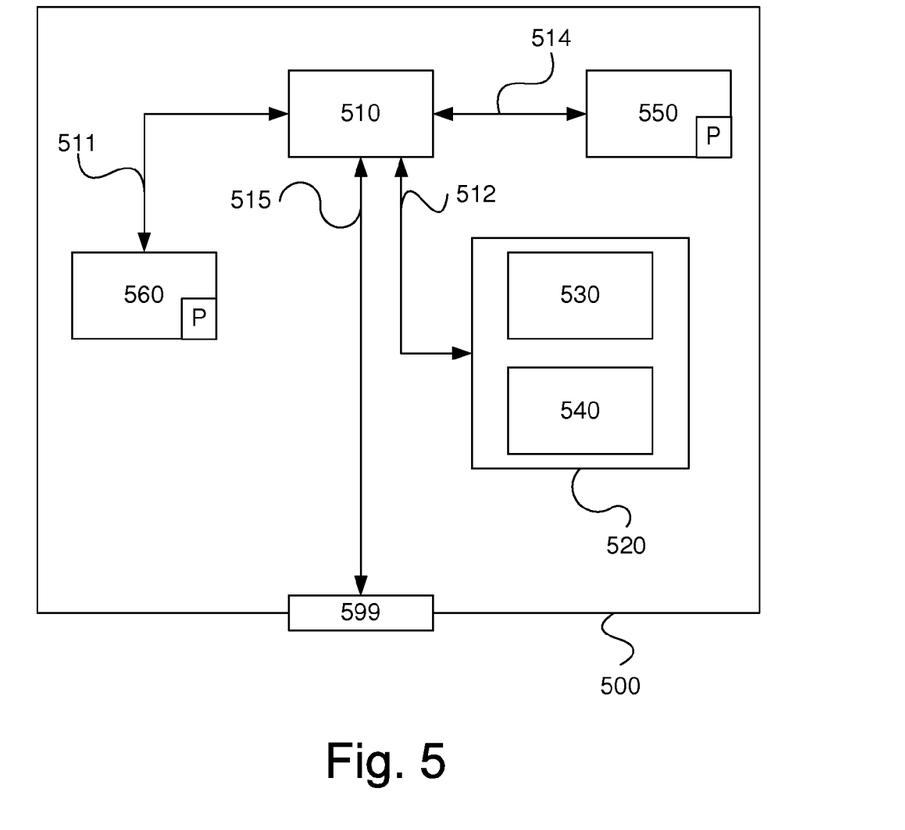
FIG. 5 schematically illustrates a computer according to an embodiment of the invention.

FIG. 5 is a diagram of one version of a device 500. The control units 200 and 210 described with reference to FIG. 2 may in one version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the operation of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

A proposed computer programme P may comprise routines for troubleshooting in an SCR system which comprises a dosing unit for dosing of reducing agent into an engine's exhaust duct upstream of an SCR catalytic converter for reduction of $NO_x$ content in an exhaust flow from said engine and a DOC unit.

The computer programme P may comprise routines for determining satisfactory operation of said SCR catalytic converter 270. The programme P may comprise routines for determining $NO_x$ content in the exhaust flow downstream of said catalyst. It may comprise routines for progressively altering the dosage of said reducing agent during predetermined operating conditions of said DOC unit. It may comprise routines for determining whether the SCR system can reduce said $NO_x$ content of the exhaust flow downstream of said SCR catalytic converter to a predetermined extent during said progressively altered dosing. It may comprise routines for using the results of said determinations as a basis for deciding whether said DOC unit is faulty or not. It may comprise routines for establishing said predetermined operating conditions in the form of a specific highest temperature level of said DOC unit and a predetermined exhaust mass flow. It may comprise routines for establishing said predetermined operating conditions in the form of a specific temperature level within a predetermined range Tint2 of said DOC unit and a predetermined exhaust mass flow. It may comprise routines for establishing said predetermined operating conditions in the form of a specific temperature level within a predetermined range Tint2 of said SCR system and a predetermined exhaust mass flow. It may comprise routines for establishing said predetermined operating conditions in the form of a specific lowest temperature level of said SCR catalytic converter and a predetermined exhaust mass flow. It may comprise routines for establishing said predetermined operating conditions in the form of a specific temperature level within a predetermined range Tint1 of said SCR catalytic converter and a predetermined exhaust mass flow. It may comprise routines for establishing said predetermined operating conditions in the form of a specific temperature level within a predetermined range Tint1 of said SCR system and a predetermined exhaust mass flow. It may comprise routines for establishing said predetermined operating conditions by control of the operation of said engine. It may comprise routines for waiting for a continuity state of the reduction of $NO_x$ content downstream of said SCR catalytic converter.

The computer programme P may comprise routines for
determining absolute values for said $NO_x$ content in the exhaust flow downstream of said SCR catalytic converter, and/or routines for
determining absolute values for said $NO_x$ content in the exhaust flow upstream of said SCR catalytic converter, determining absolute values for said $NO_x$ content in the exhaust flow downstream of said SCR catalytic converter, and determining a degree of $NO_x$ conversion by the SCR catalytic converter on the basis of said $NO_x$ content in the exhaust flow upstream of it and said $NO_x$ content in the exhaust flow downstream of it.

The computer programme P may comprise routines for representing said SCR catalytic converter's reduction of $NO_x$ content downstream of it during said progressively altered dosing as absolute values of said $NO_x$ content downstream of it as a function of reducing agent dosage or degree of $NO_x$ conversion as a function of reducing agent dosage.

The computer programme P may comprise routines for identifying a minimum of a function for said $NO_x$ content downstream of said SCR catalytic converter as a function of reducing agent dosage. It may comprise routines for identifying a maximum of a function for degree of $NO_x$ conversion by the SCR catalytic converter as a function of reducing agent dosage.

The computer programme P may comprise routines for presenting said results of said determinations of reduction of said $NO_x$ content in the exhaust flow downstream of said SCR catalytic converter 270 to a predetermined extent in the form of a fault code. It may comprise routines for carrying out a check on the SCR system's operation beyond said SCR catalytic converter.

The programme P may be stored in an executable form or in compressed form in a memory 560 and/or in a read/write memory 550.

Where the data processing unit 510 is described as performing a certain function, it means that the data processing unit conducts a certain part of the programme stored in the memory 560, or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is adapted to communicating with the data processing unit via a data bus 514. The data port 599 may for example have the links L210, L230, L240, L250, L255, L260, L265, L280 and L285 connected to it (see FIG. 2).

When data are received on the data port 599, they are stored temporarily in the second memory element 540. When input data received have been temporarily stored, the data processing unit 510 is prepared to conduct code execution as described above.

In one version signals received on the data port 599 convey information about $NO_x$ content upstream of the SCR catalytic converter 270. In one version they convey information about $NO_x$ content downstream of the SCR catalytic converter. In one version they convey information about a prevailing temperature of the exhaust gases upstream of the SCR catalytic converter. In one version they convey information about a prevailing temperature of a suitable surface or component of the exhaust duct 290, e.g. a temperature of the SCR catalytic converter 270 or a temperature of said DOC unit 259.

The signals received on the data port 599 may be used by the device 500 to decide whether said SCR catalytic converter is faulty or not from an NO content reduction perspective.

The signals received on the data port may be used by the device 500 to decide whether said DOC unit is faulty or not.

Parts of the methods herein described may be conducted by the device 500 by means of the data processing unit 510 which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive, nor to restrict the invention to the variants described. Many modifications and variations will obviously suggest themselves to one skilled in the art. The embodiments have been chosen and described in order best to explain the principles of the invention and their practical applications and thus make it possible for one skilled in the art to understand the invention for different embodiments and with the various modifications appropriate to the intended use.

The invention claimed is:

1. A device for determining fault in an SCR system, wherein said SCR system comprises:
   a dosing device for dosing of reducing agent into an engine's exhaust duct upstream of an SCR catalytic converter for reduction of $NO_x$ content in an exhaust flow from said engine; and
   a DOC unit situated upstream of said SCR catalytic converter on said exhaust duct; and
   the device for determining fault comprising at least one data processing unit and at least one memory configured to,
   1) determine $NO_x$ content in the exhaust flow downstream of said SCR catalytic converter;
   2) determine satisfactory operation of said SCR catalytic converter;
   3) progressively alter a dosage of said reducing agent during predetermined operating conditions of said DOC unit;
   4) determine whether said SCR system can reduce said NO content of the exhaust flow downstream of said SCR catalytic converter to a predetermined extent during said progressively altered dosing, and
   5) use results of said determinations as a basis for deciding whether said DOC unit is faulty or not.

2. A device according to claim 1, wherein said device is further configured to establish said predetermined operating conditions in the form of a predetermined temperature level within a predetermined temperature range (Tint2) of the SCR system and a predetermined exhaust mass flow.

3. A device according to claim 1, wherein said device is further configured to establish said predetermined operating conditions by control of operation of said engine.

4. A device according to claim 1, wherein said device is further configured to alter said dosage by continuously increasing or continuously decreasing said dosage.

5. A device according to claim 4, wherein said device is further configured to wait for a continuity state of reduction of $NO_x$ content downstream of said SCR catalytic converter.

6. A device according to claim 1, wherein said device is further configured to progressively alter said dosage by increasing said dosage step by step or decreasing said dosage step by step.

7. A device according to claim 1, wherein said device is further configured to,
   determine whether said SCR system can reduce said $NO_x$ content of said exhaust flow downstream of said SCR catalytic converter to a predetermined extent, said means configured for determining comprises:

determine absolute values for said $NO_x$ content in said exhaust flow downstream of said SCR catalytic converter;

and/or determine absolute values for said $NO_x$ content in said exhaust flow upstream of said SCR catalytic converter;

determine absolute values for $NO_x$ content in said exhaust flow downstream of said SCR catalytic converter; and determine a degree of $NO_x$ conversion by said SCR catalytic converter on the basis of said $NO_x$ content in said exhaust flow upstream of said SCR catalytic converter and said $NO_x$ content in said exhaust flow downstream of said SCR catalytic converter.

8. A device according to claim 1, wherein said device is further configured to represent said SCR system's reduction of $NO_x$ content downstream of said SCR catalytic converter during said progressively altered dosing as absolute values of said $NO_x$ content downstream of said SCR catalytic converter as a function of reducing agent dosage or as a degree of $NO_x$ conversion as a function of reducing agent dosage.

9. A device according to claim 8, wherein said $NO_x$ content downstream of said SCR catalytic converter as a function of reducing agent dosage comprises a minimum.

10. A device according to claim 8, wherein said degree of $NO_x$ conversion as a function of reducing agent dosage comprises a maximum.

11. A device according to claim 1, wherein said device is further configured to present said result of said determination of reduction of said $NO_x$ content in said exhaust flow downstream of said SCR catalytic converter to a predetermined extent in the form of a fault code.

12. A device according to claim 1, wherein said device is further configured to carry out a check on the SCR system's operation beyond said SCR catalytic converter.

13. A motor vehicle provided with a device according to claim 1.

14. A method for determining fault in an SCR system that comprises a dosing device for dosing of reducing agent into an engine's exhaust duct at a location upstream of an SCR catalytic converter for reduction of $NO_x$ content in an exhaust flow from said engine and a DOC unit, the method comprising the steps of:

determining $NO_x$ content in the exhaust flow downstream of said SCR catalytic converter;

determining a satisfactory operation of said SCR catalytic converter;

supplying and progressively altering a dosage of said reducing agent during predetermined operating conditions of said DOC unit;

determining whether said SCR system can reduce said $NO_x$ content of said exhaust flow downstream of said SCR catalytic converter to a predetermined extent during said progressively altered dosing; and using results of said determinations as a basis for deciding whether said DOC unit is faulty or not.

15. A method according to claim 14, further comprising the step of establishing said predetermined operating conditions in the form of a predetermined temperature level within a predetermined temperature range (Tint2) of said SCR system and a predetermined exhaust mass flow.

16. A method according to claim 14, further comprising the step of establishing said predetermined operating conditions by control of operation of said engine.

17. A method according to claim 14, wherein said step of progressively altering said dosage comprises continuously increasing or continuously decreasing said dosage.

18. A method according to claim 17, further comprising a step of waiting for a continuity state of the reduction of $NO_x$ content downstream of said SCR catalytic converter.

19. A method according to claim 14, wherein said step of progressively altering said dosage comprises increasing said dosage step by step or decreasing said dosage step by step.

20. A method according to claim 14, wherein said step of determining whether said SCR system can reduce said $NO_x$ content of said exhaust flow downstream of said SCR catalytic converter to a predetermined extent comprises the steps of:

determining absolute values for said $NO_x$ content in the exhaust flow downstream of said SCR catalytic converter, and at least one of the steps of:

determining absolute values for said $NO_x$ content in said exhaust flow upstream of said SCR catalytic converter;

determining absolute values for said $NO_x$ content in said exhaust flow downstream of said SCR catalytic converter; and determining a degree of NO), conversion by said SCR catalytic converter on the basis of said $NO_x$ content in said exhaust flow upstream of said SCR catalytic converter and said $NO_x$ content in said exhaust flow downstream of said SCR catalytic converter.

21. A method according to claim 14, further comprising the step of representing said SCR system's reduction of $NO_x$ content downstream of said SCR catalytic converter during said progressively altered dosing as absolute values of said $NO_x$ content downstream of said SCR catalytic converter as a function of reducing agent dosage or as a degree of $NO_x$ conversion as a function of reducing agent dosage.

22. A method according to claim 21, in which said $NO_x$ content downstream of said SCR catalytic converter as a function of reducing agent dosage comprises a minimum.

23. A method according to claim 21, in which said degree of $NO_x$ conversion as a function of reducing agent dosage comprises a maximum.

24. A method according to claim 14, further comprising the step of presenting said results of said determinations of reduction of said $NO_x$ content in said exhaust flow downstream of said SCR catalytic converter to a predetermined extent in the form of a fault code.

25. A method according to claim 14, further comprising determining satisfactory operation of said SCR catalytic converter at a temperature (T1, T2) within a predetermined first temperature range (Tint1), and determining whether said SCR system can reduce said $NO_x$ content of said exhaust flow downstream of said SCR catalytic converter to a predetermined extent at a temperature (T1, T2) within a predetermined second temperature range (Tint2).

26. A computer programme product comprising a computer programme (P) for determining fault in an SCR system, the programme (P) comprises a programme code stored on a non-transitory computer-readable medium and the code is for causing an electronic control unit or another computer connected to said electronic control unit to perform method steps according to claim 1 when said programme code is run on said electronic control unit or said another computer connected to said electronic control unit.

* * * * *